Dec. 2, 1958  F. E. OBERMAIER  2,862,523
THERMOSTATIC FLUID RESTRICTOR
Filed April 18, 1955  2 Sheets-Sheet 1

INVENTOR
FRANK E. OBERMAIER

BY  ATTORNEYS

Dec. 2, 1958  F. E. OBERMAIER  2,862,523
THERMOSTATIC FLUID RESTRICTOR
Filed April 18, 1955  2 Sheets-Sheet 2
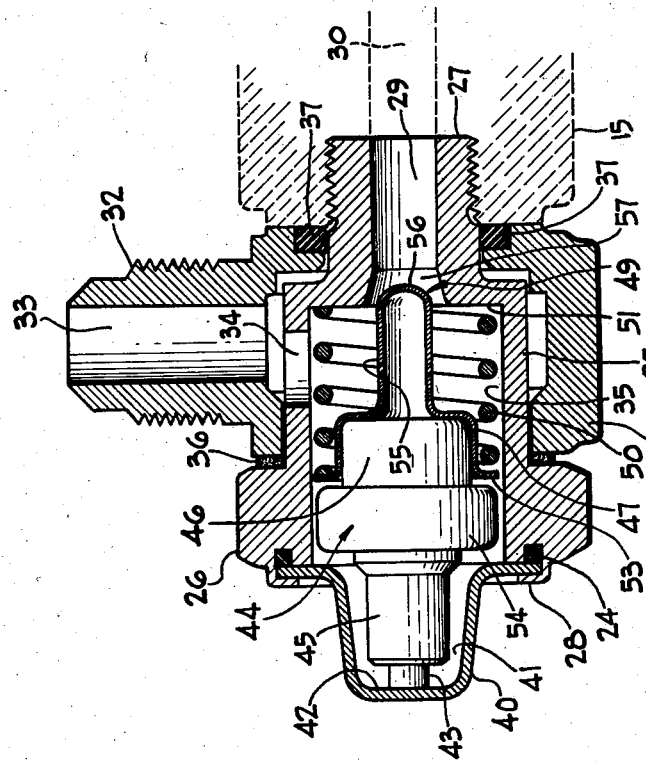
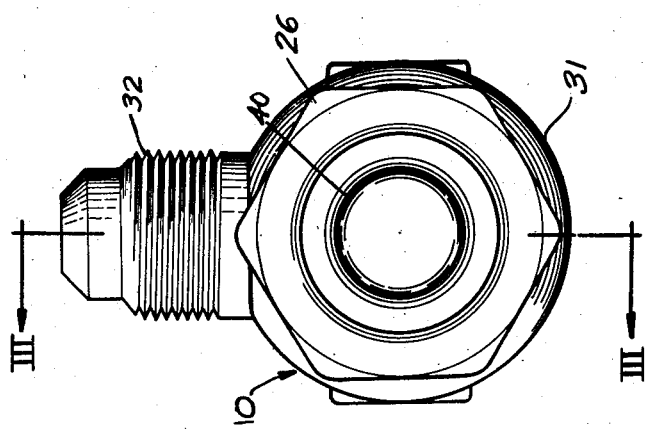
INVENTOR
FRANK E. OBERMAIER
BY  ATTORNEYS

United States Patent Office 2,862,523
Patented Dec. 2, 1958

2,862,523

THERMOSTATIC FLUID RESTRICTOR

Frank E. Obermaier, Oak Park, Ill., assignor to The Dole Valve Company, Chicago, Ill., a corporation of Illinois Application April 18, 1955, Serial No. 501,988

7 Claims. (Cl. 138—46)

This invention relates to improvements in hydraulic power actuating systems and thermostatically operated fluid restrictor valves therefor.

A principal object of my invention is to provide a novel and improved form of power actuating system so arranged as to maintain a measured flow of hydraulic fluid to the system regardless of temperature variations.

Another object of my invention is to provide a simplified and improved form of valve for metering the flow of fluid in accordance with changing viscosities of the fluid due to changing temperature conditions.

Still another object of my invention is to provide a simplified form of thermostatic fluid restrictor valve in the form of a contoured metering pin cooperating with an orifice in which a simplified form of thermal element having an extensible piston serves to move the metering pin along the orifice to restrict the flow of fluid therethrough in accordance with predetermined temperature rises.

A still further object of my invention is to provide a fluid restrictor valve of a more simplified form than formerly in which the valve is removably carried on the casing of a power or wax type thermal element and a single spring maintains the valve and thermal element in position within the valve chamber and also serves as a return spring for the thermal element.

These and other objects of my invention will appear from time to time as the following specification proceeds and with reference to the accompanying drawings wherein:

Figure 2 is an end view of the fluid restrictor valve; and

Figure 3 is a longitudinal sectional view taken substantially along line III—III of Figure 2.

Figure 1:
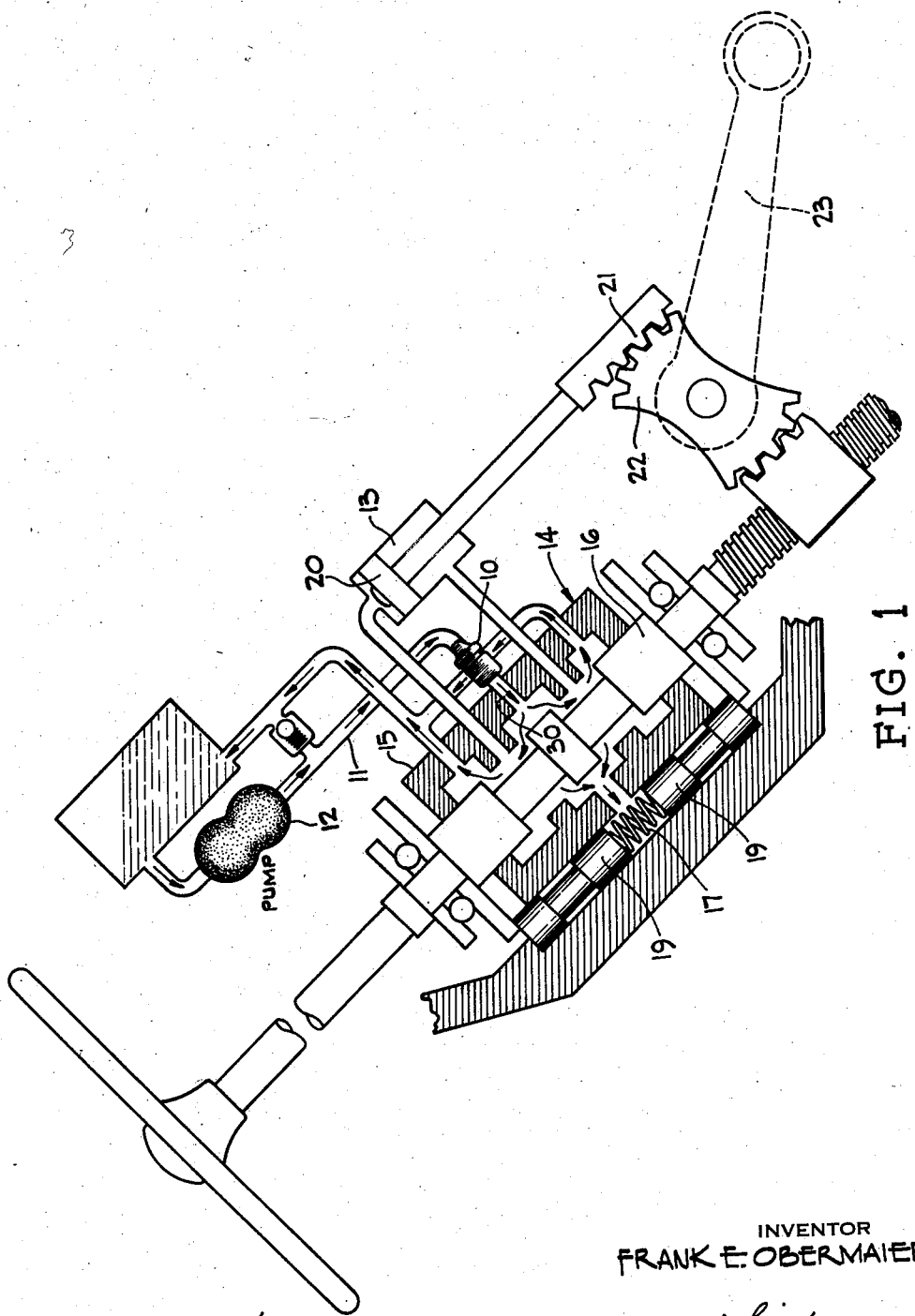
Figure 1 is a diagrammatic view illustrating a power steering system having a thermostatically operated fluid restrictor valve constructed in accordance with my invention associated therewith.

In Figure 1 of the drawings, I have generally shown a thermostatic fluid restrictor valve 10 constructed in accordance with my invention connected in a pressure line 11 leading from a pump 12, and metering the flow of hydraulic fluid under pressure to a power steering cylinder 13 through a valve 14 operated by turning movement of the steering wheel, to supply fluid under pressure to the head or piston rod ends of said power steering cylinder in accordance with steering requirements.

While I have herein shown my valve in association with and as a part of a power steering system, it should be understood that this showing is for illustrative purposes only and that the valve of my invention may be used as well for various other hydraulically actuated systems where there is a need for a predetermined flow of oil under pressure for operating the hydraulically actuated devices under various temperature conditions and varying viscosities of the oil due to changes in temperature.

The valve 10 may be threaded in a housing 15 of the valve 14 either at the inlet to said housing as shown in Figure 1 or at either of the outlets from said housing to the power steering cylinder 13, as long as the valve is in direct association with the hydraulic actuating fluid, to respond to the temperature thereof.

The valve 14 comprises generally a valve spool 16 in a housing 15 and movable along said housing against a series of compression springs 17 and plungers 19 in accordance with the need for power, to assist steering.

The valve spool 16 is shown in Figure 1 in a neutral position and is maintained centered in this position by the springs 17 and plungers 19 and by hydraulic fluid acting against said plungers, when the steering load is below that requiring power boosting. As the steering load increases due to increasing effort at the steering wheel, the resistance of the springs 17 is overcome and the valve spool 16 will move in one direction in the valve housing to direct the hydraulic pressure from the pump 12 to one end of the power steering cylinder 13, to cause a piston 20 within said cylinder to move a rack 21 and aid in rotating a sector gear 22 for turning a pitman arm 23 as is usual in such steering systems.

If the steering wheel is being turned in an opposite direction the valve spool 16 will move along the valve housing 15 in an opposite direction to conduct fluid under pressure to the opposite end of the cylinder 13 and aid in turning the pitman 23 and steering wheels in an opposite direction from that just described.

Referring now in particular to the valve 10 as shown in Figures 2 and 3, said valve includes a valve body 25 having a generally enlarged hex head 26 formed integrally therewith at one end thereof and having a reduced diameter portion 27 having an outlet passageway 29 leading therethrough and shown as being threaded within the housing 15 for the valve 14 to conduct hydraulic fluid under pressure to an inlet 30 in said valve housing.

The valve body 25 except for the hex head 26 is of a generally cylindrical form and is shown as extending through and carrying a fluid conducting fitting 31 having a hollow threaded boss 32 projecting from one end thereof and having an inlet passageway 33 leading therethrough at right angle to the outlet 29 in the valve body 25. The inlet passageway 33 has communication with an inlet 34 in the wall of the valve body 25, for conducting fluid under pressure to a chamber 35 extending along said valve body and in axial alignment with the outlet 29. The fitting 32 is shown as being sealed to the valve body 25 as by an annular seal 36 interposed between an end of said fitting and the inner end of the hex head 26, and a seal 37 in a recessed portion of the fitting 31 opening toward the reduced diameter portion 27 of the valve body 25 and facing the valve housing 15.

The valve chamber 35 is shown as being closed by an end cap 40 having a recessed central portion 41 in the form of a deep dish, and having an end wall 42 abutted by a piston 43 of a thermal element 44. The end cap 40 is shown as being sealed to the end of the valve body by an annular seal 24 and as being maintained in engagement within the valve body by a spun over portion 28 of the valve body, spun inwardly into engagement with the outer rim of the end cap 40.

The thermal element 44 is shown as being of the so-called power or wax type of thermal element having its power member or piston 43 extensible from a cylinder 45 upon predetermined rises in temperature, and having a casing 46 for a thermally expansible material extending from the cylinder 45 and seated in a cup-like receptacle 47 of a restrictor or metering valve 49. A spring 50, seated at one end in a shouldered wall 51 of the chamber 35 and at its opposite end in a flange 53 of the receptacle 47 for the valve 49 is provided to bias the valve 49 in a retracted position, to maintain said valve and thermal element within the chmaber 35 and to return the piston 43 within the cylinder 45 upon predetermined reductions in temperature.

The casing 46 is surrounded by a conductor ring 54 on the end of said casing adjacent the cylinder 45, and contains a fusible thermally expansible material, which may be a wax alone or a wax and a powdered metal heat conducting material and a binder, such as is shown and described in Patent No. 2,259,846 which issued to Sergius Vernet on October 21, 1941. The thermal element 44 is shown as being of the same general type as shown and described in the Vernet Patent No. 2,368,181, dated January 30, 1945, and commonly known as a "Vernay" thermal element. In such elements, the thermally expansible material carried within the casing 47 expands as it reaches its fusion point and acts against a membrane or deformable member (not shown), to extend the piston 43 from the cylinder 45 upon predetermined rises in temperature.

The metering pin or valve 49 is shown as having a relatively long cylindrical wall 55 terminating into a curved end portion 56, shown as extending partially within a frusto-conical wall 57 leading from the shoulder 51 and terminating in the outlet 29 in axial alignment therewith.

The outer diameter of the cylindrical wall 55 of the metering pin or valve 49 is less than the diameter of the outlet 29 so as to never block the flow of hydraulic fluid through the outlet 29 regardless of the operating temperatures to which the thermal element 44 may be subjected.

The valve 49 and frusto-conical wall 57 are shown as being contoured to provided for changes in flow travel relationship as the valve moves along the frusto-conical wall 57 into the outlet 29 in accordance with the viscosity of the hydraulic fluid and the temperature to which the thermal element 44 is subjected.

It may be seen from the foregoing that an extremely simple thermostatic fluid restrictor valve has been provided particularly adapted for a power steering or other hydraulically operated systems in which it is both necessary and desirable to maintain a uniform flow of hydraulic fluid under pressure, regardless of temperature changes.

It may further be seen that the fluid restrictor valve and its thermal element is maintained in position in the valve casing merely by the return spring for the valve which also serves as the return spring for the thermal element, and that the sensitive part of the thermal element is positioned to be in direct contact with fluid flowing through the outlet 29, and thus quickly responds to temperature changes of the hydraulic fluid under pressure.

It will be understood that modifications and variations of the present invention may be effected without departing from the spirit and scope of the novel concepts thereof.

I claim as my invention:

1. In a thermostatic fluid restrictor valve, a valve body having a valve chamber therein, an inlet into said chamber, an outlet therefrom, a valve in said chamber comprising an elongated metering pin in axial alignment with said outlet and moving thereinto upon predetermined increases in temperature, a spring seated in said chamber and engaging said valve and retractibly moving said valve with respect to said outlet, and a thermal element within said chamber, mounting said valve within said chamber and having a piston extensible upon predetermined increases in temperature and reacting against an end of said chamber for moving said valve within said outlet to restrict the flow therethrough upon certain predetermined increases in temperature of the fluid flowing through said chamber.

2. In a thermostatic fluid restrictor valve, a valve body having a valve chamber therein, an inlet into said chamber, an outlet therefrom, a valve in said chamber and comprising an elongated metering pin in axial alignment with said outlet, said outlet having an entering end portion converging from said chamber to a reduced diameter portion leading from said chamber, and said outlet being of a larger diameter than said metering pin throughout the length thereof, a spring seated in said chamber and engaging said valve and biasing said valve in a retracted position with respect to said outlet, a thermal element with said chamber comprising a casing having said valve seated thereon and having a piston engaging an end of said chamber and moving said valve within said outlet upon predetermined increases in temperature of the fluid flowing through said valve chamber.

3. In a thermally operated fluid restrictor valve, a valve body having a valve chamber therein, an inlet into said chamber, an outlet from said chamber in axial alignment therewith, a valve in said chamber in axial alignment with said outlet and having a metering pin movable within said outlet for restricting the flow of fluid therethrough, a thermal element within said body for operating said valve and having a casing, a cylinder extending therefrom and a power member extensible from said cylinder upon predetermined increases in temperature, said valve having a cup-like receptacle fitting over said casing of said thermal element, and a return spring seated in said chamber and having engagement with said receptacle for maintaining said valve and thermal element in position within said casing and biasing said power member in its retracted position with respect to said cylinder and said valve in a retracted position with respect to said outlet.

4. In a thermostatic fluid restrictor valve, a valve body having a valve chamber therein, an inlet into said chamber, an outlet leading from an end wall of said chamber and having a converging wall portion leading from said end wall and a cylindrical wall portion leading therefrom, a valve in said chamber for association with said outlet and comprising an elongated metering pin of smaller diameter than said outlet throughout the length thereof and having a receptacle opening to the opposite end of said chamber from said metering pin, a spring engaging said receptacle and retractibly biasing said valve, a thermal element within said chamber and comprising a casing seated in said receptacle and retained thereto by said spring, a cylinder leading from said casing toward the opposite end of said chamber from said outlet, and a piston extensible from said cylinder and engageable with an end of said chamber, for moving said valve within said outlet upon predetermined increases in temperature.

5. A thermostatic fluid restrictor valve particularly adapted for power steering systems for maintaining a uniform flow rate of hydraulic fluid regardless of variations in viscosity thereof comprising a valve body having a chamber therein and extending therealong, an inlet within said chamber through a wall thereof, an outlet from said chamber in axial alignment therewith, a thermal element within said chamber having a casing extending inwardly of said chamber, a cylinder extending therefrom toward an outer end of said chamber and a piston extensible from said cylinder in axial alignment with said outlet and abutting an end of said chamber, a valve on said casing having a metering pin extending therefrom in axial alignment with said outlet and terminating in a contoured end movable within said outlet to provide changes in flow travel relationship in accordance with the position of said metering pin with respect to said outlet, and a spring seated in said chamber and having engagement with said valve for maintaining said valve in engagement with said casing and for returning said piston within said cylinder.

6. A thermostatic fluid restrictor valve particularly adapted for power steering systems and the like for maintaining a substantially constant flow rate of hydraulic fluid under pressure regardless of variations in viscosity of the hydraulic fluid, comprising a valve body having a central chamber extending therealong having a shouldered wall at one end terminating into an elongated outlet having a frusto-conical wall at the inlet end therof and a generally cylindrical wall leading therefrom, an inlet into said chamber, a thermal element within said chamber having a casing extending inwardly of said chamber, a cylinder extending from said casing in a direction outwardly of said chamber and having a piston extensible therefrom, an end cap for said valve body, an engaging connection between said piston and said end cap, a valve in axial alignment with said outlet and having a generally cylindrical wall and a contoured end portion in association with the frusto-conical wall of said outlet, said cylindrical wall terminating into a cup-like receptacle extending over said casing and having a flanged portion projecting outwardly therefrom, and a spring seated on said flanged portion of said valve and said shouldered portion of said valve body for maintaining said thermal element in position within said valve body and serving as a return spring for said piston and valve.

7. In a thermostatic fluid restrictor valve, a valve body having a valve chamber therein, an inlet passageway into said body for conducting fluid into said chamber, an outlet passageway from said body for conducting fluid from said chamber, a thermal element in said chamber having a casing in heat conducting relation with respect to the fluid flowing therethrough and having a power member extensible from said casing upon predetermined increases in the temperature of the fluid flowing through said chamber, a valve in said chamber operatively connected with said thermal element, said valve having a metering portion in alignment with one of said passageways for movement thereinto upon extensible movement of said power member upon predetermined increases in temperature of the fluid flowing through said chamber, and a spring in said chamber biasing said valve away from said one passageway and returning said power member within said casing upon predetermined reductions in temperature of the fluid flowing through said chamber.

References Cited in the file of this patent
UNITED STATES PATENTS

| | | |
|---|---|---|
| 1,566,995 | Standerwick | Dec. 22, 1925 |
| 2,004,522 | Douglas | June 11, 1935 |
| 2,238,110 | Guild | Apr. 15, 1941 |
| 2,272,684 | Vickers | Feb. 10, 1942 |
| 2,343,375 | Herman | Mar. 7, 1944 |
| 2,504,063 | Aronson | Apr. 11, 1950 |
| 2,668,663 | Kmiecik | Feb. 9, 1954 |